Dec. 14, 1926.

A. RICHTER

ABSORPTION REFRIGERATOR

Filed Sept. 15, 1924

1,610,708

Inventor:
A. Richter
By Marko & Clerk
Attys.

Patented Dec. 14, 1926.

1,610,708

UNITED STATES PATENT OFFICE.

ALFRED RICHTER, OF DOBERITZ, NEAR BERLIN, GERMANY, ASSIGNOR TO A.-G. FUR HANDELS- UND INDUSTRIEWERTE GLARUS, OF GLARUS, SWITZERLAND.

ABSORPTION REFRIGERATOR.

Application filed September 15, 1924, Serial No. 737,916, and in Germany July 31, 1922.

This invention relates to absorption refrigerators of the type having a vessel acting as boiler and absorber with an inserted part. The boiler is filled with a refrigerating liquid (for instance an aqueous ammonia solution) and is in communication with a condenser and evaporator made gastight to the exterior.

During the so-called expulsion or boiling period the vessel is heated, whereby the ammonia or other refrigerating medium is driven out of the water. It flows in the form of gas to the condenser, which is cooled for instance by cooling water, is condensed and passes to the evaporator in a liquid state. The evaporator is mounted in the space to be cooled, for instance the space in a refrigerating cabinet, and absorbs heat from its exterior surroundings. This heat evaporates the liquid refrigerating medium, causing it to withdraw heat from its surroundings and cool the same. After the refrigerating medium has been completely driven out in the boiler (which is effected in a relatively short time) the heating means for the boiler is turned off and the boiler cooled, for instance by cooling water, whereby a partial vacuum is formed in it above the water and the gaseous refrigerating medium, which is again evaporated in the evaporator through the absorption of heat and is at a higher pressure, can be drawn back by suction. The refrigerating medium may pass by way of the condenser, the cooling means for which are then regularly put out of operation, or may be conveyed back to the vessel by some other path.

The returning gaseous refrigerating medium must be conveyed to the vessel in such a manner as to flow through the liquid contained in it from the bottom to the top, so as to pass into the partial vacuum above the liquid. The suitably selected refrigerating medium as it flows back is readily absorbed or dissolved by the liquid in the vessel, until finally the liquid is again in its original state, namely enriched with the refrigerating medium.

The liquid is referred to as an absorption liquid, the gas, which enters into solution with it, forms the refrigerating medium proper and the period, within which the return suction and absorption of the refrigerating medium takes place, is referred to as the absorption period.

The absorption liquid and the refrigerating medium may be selected, so as to suit the circumstances; it is only essential that the absorption medium shall have a higher boiling point than the refrigerating medium and that the latter shall evaporate at the outside temperatures, which are likely to occur; the latter are naturally dependent on the location and the climate. It is also necessary that the absorption and refrigerating media shall go into solution with one another.

Refrigerating machines working on this so-called absorption system should have as few moving parts as possible or no such parts at all for causing the transition from the boiling to the absorption period and vice versa, in so far as these devices extend into the gas space of the boiler, condenser or evaporator or into the parts connecting the same, in which case it is necessary for all joints to be carefully packed so as to avoid any danger of leakage. The apparatus should also be made as simple as possible and the conditions for thorough absorption of the refrigerating medium should be fulfilled.

The present invention provides refrigerating machines which fulfil the above conditions. It consists in the provision of an insertion of a known kind, which is placed in the vessel acting as a boiler and an absorber, the said insertion having only an opening on its lower side, which is immersed by a predetermined amount in the refrigerating liquid, when not operative, say at the beginning of the boiling period and at the end of the absorption period, and in the means for the supply and escape of the gases or of the refrigerating medium proper (ammonia solution or the like) opening only into the outer vessel surrounding the insertion.

A further feature of the invention consists in the heating arrangements, the heat of which may be derived from any source (electricity, gas, petroleum or the like) being located as directly as possible below the opening in the inserted part.

The accompanying drawing shows a constructional example of the invention.

Figure 1:
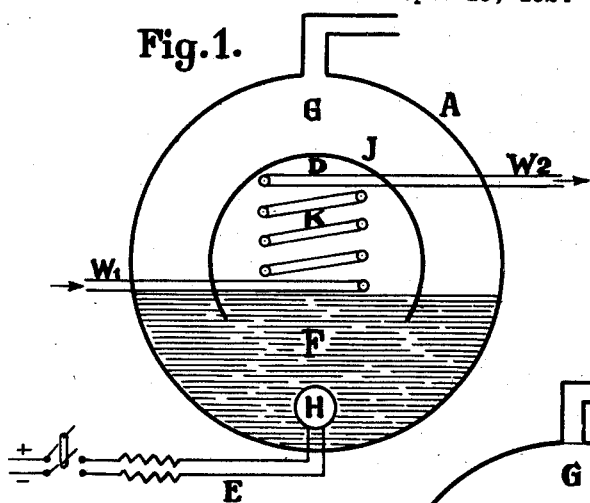
Fig. 1 is a section through the apparatus, when the latter is not in operation.

A cylindrical vessel A which is shown in section, is provided with an inserted part J, which is preferably cylindrical and has a wide opening at the bottom. The absorption liquid F fills the vessel A and the lower part of the insertion J to a predetermined amount when the apparatus is not in operation (Fig. 1). The insertion J therefore acts in the manner of a diving bell. Above the liquid in the insertion J is a space marked D forming the so-called steam space. In this space is a cooling coil K of suitable dimensions, which, when the apparatus is not in operation (Fig. 1), is more or less above the absorption liquid F in the steam space and in any case is not immersed in the absorption liquid. Through this coil a liquid cooling medium is assumed to flow, which enters at $W^1$ and escapes at $W^2$.

As directly as possible below the opening in the insertion J and located in the absorption liquid F is a heating pipe H, in which are placed for instance one or more heating cartridges, to which current may be supplied through the means E. The spaces above the absorption liquid as well as the condenser and the evaporator must be evacuated as well as possible.

When inoperative (Fig. 1) the absorption liquid F (for instance water) is enriched, for instance saturated, with the refrigerating medium (for instance ammonia).

Figure 2:
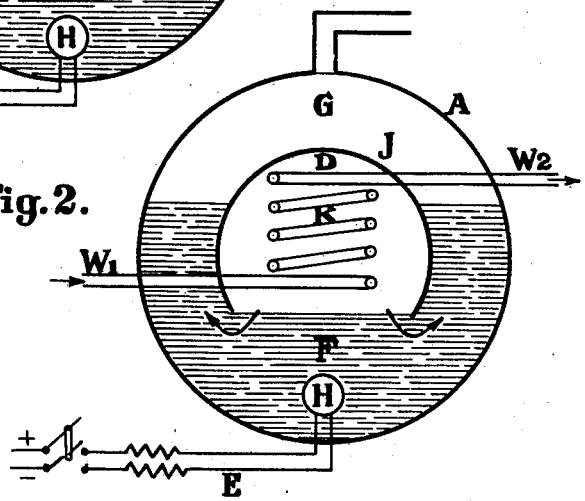
Fig. 2 is a section through the apparatus at the commencement of the driving out period, or boiling period, and Fig. 3 a section through the apparatus at the commencement of the absorption period.

The heating means being put into operation, the liquid will soon come to a boil and the refrigerating medium will escape from the liquid at an increased pressure. The refrigerating medium will pass both into the space G between the vessel A and the insertion J and into the steam space D, while the refrigerating medium in the space G can immediately expand into the condenser and evaporator and can therefore not reach any high pressures. The pressure in the relatively small space D rises rapidly, partly due to being heated directly by the heating pipe H, to which it is placed as near as possible, and completely drives the liquid out of the space D. Consequently the liquid rises at each side and partially fills the space G. This state, which is brought about very rapidly, after the heat has been turned on, is shown in Fig. 2. By continuing the heating, the refrigerating medium is driven completely out of the absorption liquid and flows out of the space G into the condenser, from where, after being condensed, it flows to the evaporator. The difference in level between the liquid in the space G and below the space D in the insertion J is easily overcome by the increased pressures in the gaseous refrigerating medium, which occur and are maintained by the source of heat, so that any refrigerating medium evaporating in the gas space D will leave this space again in the direction shown by the arrows and pass into the space G and so on.

Figure 3:
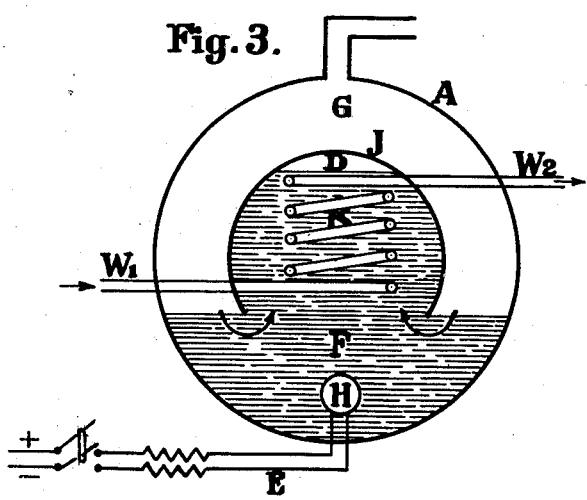

As soon as the refrigerating medium has been entirely driven out and only the negligible portion in the space D is still present, which is required for balancing the outer portion of the liquid, which is at a higher level, the heat is turned off. The cooling coil K now comes into operation, which rapidly cools off the excess refrigerating medium in the space D, whereby the pressure of the latter is reduced and a partial vacuum is created. Consequently the absorption liquid will rise in the steam space D until the liquid in the space G has descended to the edges of the bottom opening in the insertion J. This state is shown in Fig. 3. Owing to the partial vacuum above the liquid in the space D, the evaporated refrigerating medium in the evaporator will be drawn back by suction by absorbing heat from outside (wherein the refrigerating action of the machine consists) and must flow through the absorption liquid in the direction of the arrows shown in the figure. This will cause considerable eddying, the refrigerating medium will become thoroughly mixed with the absorption liquid and be absorbed by the latter until the liquid is saturated. By making the spaces D and G of suitable dimensions and using a suitable quantity of absorption liquid, the latter will be thoroughly saturated with the refrigerating medium, when the gases of the refrigerating medium, which enter gradually during the absorption process into the vacuum above the liquid in the space D, have overcome this partial vacuum and the absorption liquid has descended so far that the level outside and inside the insertion J is the same and the inoperative state (Fig. 1) has been reached again.

An important feature of the process carried out by the apparatus according to the present invention is that on the one hand the refrigerating medium is driven out rapidly and completely and on the other hand is drawn back by suction in such a manner that during the latter part of the process the gaseous refrigerating medium flowing back must always flow through a considerable portion of the absorption liquid. Hitherto this has only been possible by providing complicated circulating devices in the insertion or in the outer vessel, which not only made the manufacture of the apparatus difficult and costly but were not reliable in action.

A further advantage consists in that the cooling medium may continuously flow through the cooling coil K, without it being necessary to shut it off as hitherto. Hence, it is not only unnecessary to provide movable devices in the spaces of the vessel A, the condenser and the evaporator (cocks, valves, movable pipes and the like, which may result in leakages and in the apparatus not functioning), but it is also unnecessary to provide a controlling member in the cooling water pipe of the boiler. This result is obtained by only the gases of the refrigerating medium being present in the steam space D before and after the heat has been turned on and of the gases generated during the boiling operation only a practically negligible fraction, so that a slight withdrawal of heat at this place in the apparatus has no effect on the economical working of the apparatus. In addition to this the transfer of heat from a gas to a cooled pipe is considerably less than from a liquid to such a cooled pipe. Hence, the cooling effect in the state shown in Fig. 3 will be very energetic, while in the state shown in Fig. 2 it will be negligible.

Having now particularly described and ascertained the nature of my said invention and in what manner the same is to be performed, I declare that what I claim is:

In an absorption refrigerating apparatus, an inserted vessel having an open bottom, a vessel surrounding the inserted vessel and constituting a boiler and absorber, said inserted vessel communicating with the surrounding vessel only through the open bottom thereof, heating means for the surrounding vessel, cooling means located within the inserted vessel, means for connecting the upper portion of the surrounding vessel with a condenser, and means for controlling the heating means whereby to produce absorption and boiling periods.

ALFRED RICHTER.